United States Patent
Hustava et al.

(10) Patent No.: US 10,976,423 B2
(45) Date of Patent: Apr. 13, 2021

(54) LOW FREQUENCY MODULATED CHIRP MINIMUM DISTANCE MEASUREMENT

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 736 days.

(21) Appl. No.: 15/868,801

(22) Filed: Jan. 11, 2018

(65) Prior Publication Data

US 2019/0212423 A1    Jul. 11, 2019

(51) Int. Cl.
| G01S 7/52 | (2006.01) |
| G01S 7/527 | (2006.01) |
| G01S 15/931 | (2020.01) |
| G01S 15/10 | (2006.01) |

(52) U.S. Cl.
CPC ............ *G01S 7/527* (2013.01); *G01S 15/104* (2013.01); *G01S 15/931* (2013.01)

(58) Field of Classification Search
None
See application file for complete search history.

(56) References Cited

U.S. PATENT DOCUMENTS

| 4,788,981 A * | 12/1988 | Nagasaki ................ A61B 8/00 310/334 |
| 2014/0331772 A1 | 11/2014 | Klotz et al. |
| 2016/0025836 A1 * | 1/2016 | Derom .................... G01S 3/808 367/107 |

* cited by examiner

*Primary Examiner* — Hovhannes Baghdasaryan
(74) *Attorney, Agent, or Firm* — Polansky & Associates, P.L.L.C.; Paul J. Polansky; Rosalynn M. Smith

(57) ABSTRACT

In one form, an acoustic distance measuring circuit includes a transmitter amplifier, an acoustic transducer, and a sensing circuit. The sensing circuit includes an input adapted to be coupled to the acoustic transducer, a first correlation output for providing a chirp tail correlation signal, and a second output for providing a full chirp correlation signal. The sensing circuit provides the chirp tail correlation signal in response to correlating a chirp tail signal pattern with a received signal, and provides a full chirp correlation signal in response to correlating a full chirp signal pattern with the received signal. Further, the acoustic distance measuring circuit includes a controller adapted to be coupled to the sensing circuit that has a first input for receiving the chirp tail correlation signal and the full chirp correlation signal for determining a short range time of flight signal and a long range time of flight signal.

20 Claims, 7 Drawing Sheets

LOW FREQUENCY MODULATED CHIRP MINIMUM DISTANCE MEASUREMENT

FIELD OF THE DISCLOSURE

The present disclosure relates generally to electrical and electronic circuits, and more particularly to acoustic distance measuring systems.

BACKGROUND

Acoustic measuring systems and distance measuring systems are utilized in a variety of applications. For example, acoustic measuring systems are utilized to measure obstacle distance in applications ranging from automotive systems to fossil discovery. Acoustic measuring systems generally operate by first transmitting a pulse of acoustic energy, creating a sound wave. Then a measurement of the time of flight of the sound wave is recorded. The time of flight, which is the time from transmission of the sound wave until a reflection of the sound wave is received, determines the distance of the obstacle. Automotive applications that utilize acoustic measuring systems require reliable detection of the presence of obstacles within a broad measurement range. Currently, single modulation acoustic measuring sensors have reliable detection at a short distance detection range or a long distance detection range, but not both. For example, acoustic sensors are reliable at minimum distance detection, but limited in the maximum distance detection. Similarly, acoustic measuring sensors have reliable maximum distance detection, but are limited in the minimum distance detection.

Acoustic measuring systems often utilize acoustic transducers both to transmit the generated sound wave, and to receive the reflected signal, or echo signal. These systems often have a certain distance within which an obstacle cannot be detected, or multiple measurement modes are needed to cover the desired detection range. Low minimal distance detection and high maximum distance is preferred in acoustic measuring systems; however, dependence on the time when an echo signal crosses a threshold in response to a short distance measurement is not always detectable because the echo signal may be masked by detection of an obstacle at a longer distance. Accuracy of acoustic measuring systems is important. Switching between modulation modes to increase minimum and maximum detection ranges during distance detection could result in slow or errored object detection. Slow and/or errored object detection at any level could be detrimental in automotive and other acoustic measuring applications. Therefore, avoiding low resolution object detection related to limitations of the acoustic measuring system is important. Accuracy in time of flight calculations ensures proper acoustic measuring system functionality and related reliability.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

For simplicity and clarity of the illustration, elements in the figures are not necessarily to scale, are only schematic, and are non-limiting. Additionally, descriptions and details of well-known steps and elements are omitted for simplicity of the description. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that may prevent the values or positions from being exactly as stated.

Figure 1:
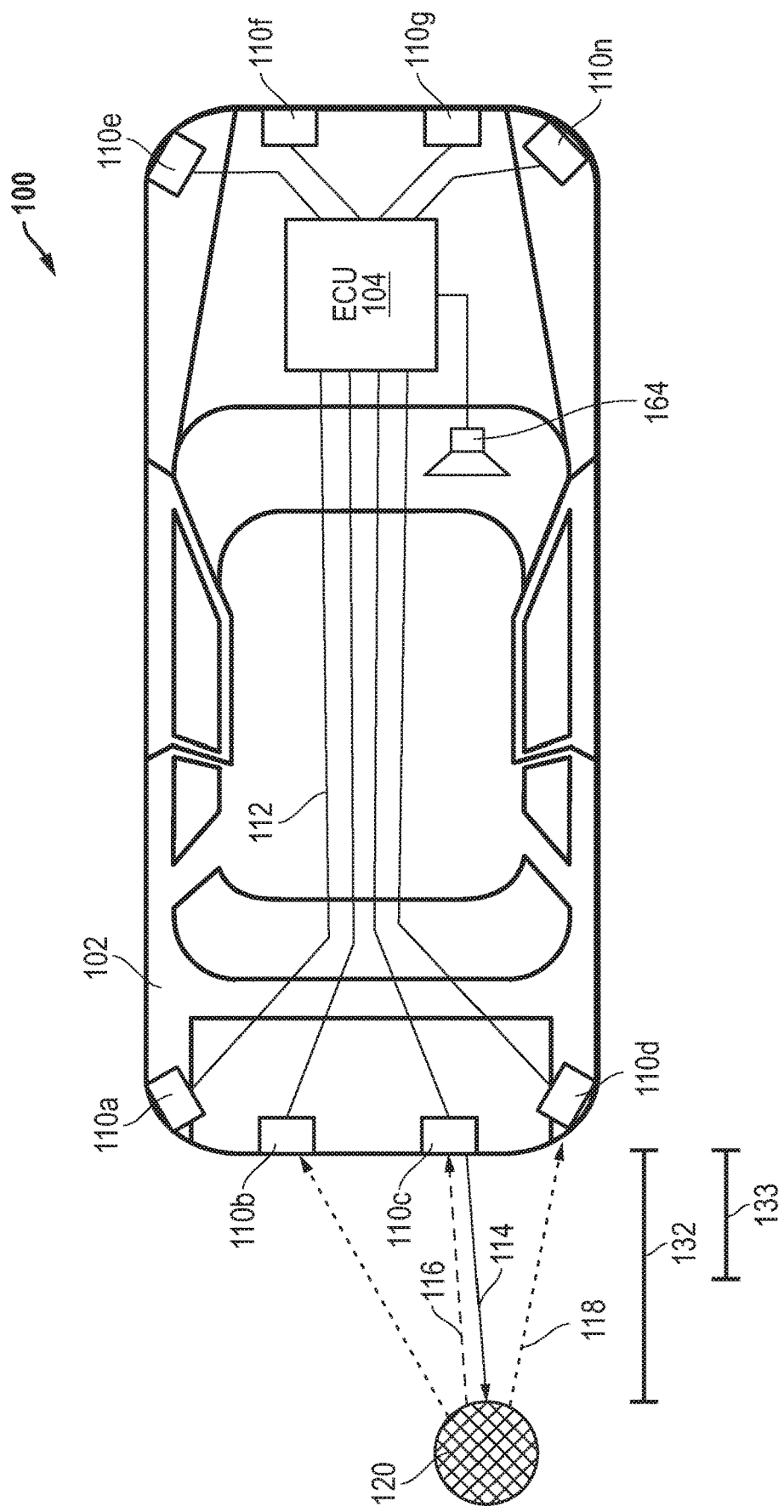
FIG. 1 illustrates in block diagram form an acoustic distance measuring system according to one embodiment.

FIG. 1 illustrates in block diagram form an acoustic distance measuring system 100 according to one embodiment. Acoustic distance measuring system 100 in FIG. 1 includes an automotive device 102, an engine control unit (ECU) 104, a loudspeaker 164, a set of transmission lines 112, a set of sensors 110, an obstacle 120, long range distance 132, and short range distance 133. A system controller, such as ECU 104, is situated on or within automotive device 102, and provides an electrical signal corresponding to an audible output to loudspeaker 164.

Automotive device 102 is communicatively connected to ECU 104. ECU 104 has an output for connecting to one or more acoustic transducers, such as sensors 110. ECU 104 has an input also connected to each of sensors 110. Additionally, ECU 104 has an output for providing an output signal to loudspeaker 164. In one embodiment, sensors 110 is an ultrasonic sensor that emits an ultrasonic pulse, or acoustic signal as described herein, that reflects off of obstacle 120 when obstacle 120 is within the wave field of the acoustic signal. The acoustic signal is generally emitted above frequencies of audible sound. The reflected pulse signal, or echo, is received by sensor 110. Detection of the echo generates an output signal for use by ECU 104. Each of sensors 110 is capable of creating an acoustic signal, and sensing a reflected pulse signal, or echo, when obstacle 120 is encountered.

In the illustrated embodiment, ECU 104 operates as a controller for an acoustic distance measuring system 100, generating an acoustic signal for sensors 110 at a first time. Sensors 110 are susceptible to receiving echo signals when a transmitted acoustic signal encounters an obstacle. The received echo signals are utilized to identify obstacle 120 within long range distance 132 and long range distance 133. ECU 104 transmits signals to sensors 110, via transmission lines 112, and responsively, sensors 110 output the acoustic signals. The acoustic signal generated by each sensor 110 travels away from sensor 110 and propagates through air. When ECU 104 stops transmission of the acoustic signal, ECU 104 monitors sensors 110 for echo signals that may be caused by interruptions to the propagating acoustic signal. When obstacle 120 is detected, an echo is received at one of sensors 110. The received echo signal is processed by sensor 110 to determine a corrected time of flight in which the acoustic signal encounters obstacle 120. The corrected time of flight is transmitted to ECU 104, via transmission lines 112. ECU 104 reports detection of obstacle 120 with respect to the surface of obstacle 120 that is closest to sensor 110 when the object is near a detection area associated with long range 132 and short range 133. Reliable detection for obstacles of varying shapes, height, and obscure dimensions, is needed. Additionally, avoiding false obstacle detection due to varying thresholds during severe noise conditions is a desirable characteristic. Acoustic distance measuring system 100 compensates for these problems as described further.

Figure 2:
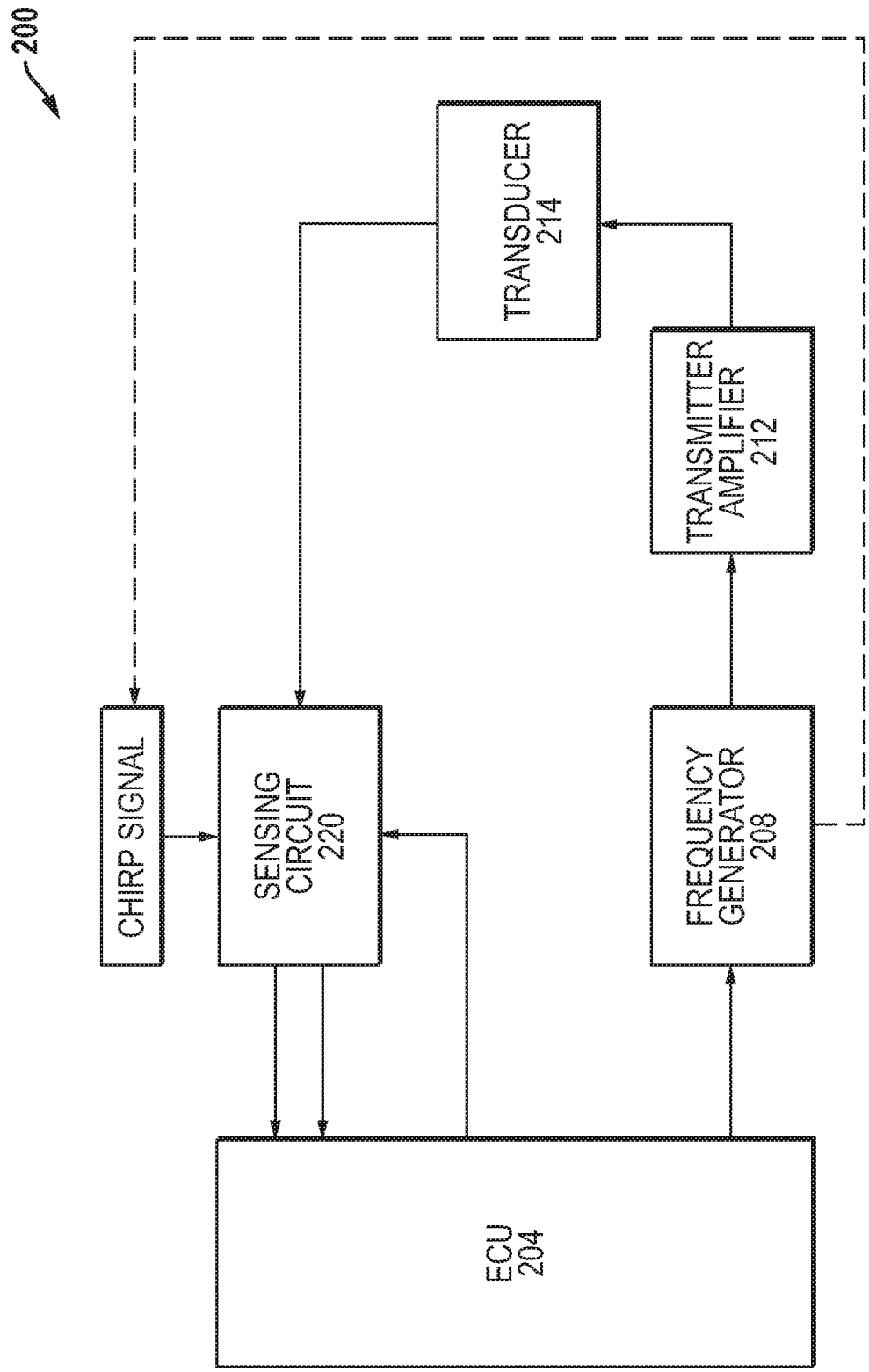
FIG. 2 illustrates in block diagram form an acoustic distance measuring circuit for use in the acoustic distance measuring system of FIG. 1.

FIG. 2 illustrates in block diagram form an acoustic distance measuring circuit 200 for use in the acoustic distance measuring system of FIG. 1. Acoustic distance measuring circuit 200 includes ECU 104, a frequency generator 208, a transmitter amplifier 212, an acoustic transducer 214, and sensing circuit 220.

ECU 104 is connected to frequency generator 208. A control signal is output to frequency generator 208 from ECU 104. ECU 104 is for example, a control system that operates the acoustic distance measuring system of FIG. 1. ECU 104 operates the acoustic distance measuring system of FIG. 1 by outputting the control signal to frequency generator 208, as well as by receiving a short range time of flight signal and a long range time of flight signal. Additionally, ECU 104 configures a threshold as a time varying signal. The threshold is configured according to the dimensional position of acoustic transducer 214, and in response to a measured effect of the background noise detected by acoustic transducer 214 to avoid false detection of obstacles. The determined threshold is utilized by ECU 104 for defining a minimal magnitude for a received pulse to cross, above a noise level, in order to detect an obstacle in response to the transmission of the acoustic signal from the acoustic transducer.

Frequency generator 208 has an input terminal for receiving the control signal, and an output terminal connected to transmitter amplifier 212.

Transmitter amplifier 212 has an input for receiving the electrical signal from frequency generator 208, and an output connected to acoustic transducer 214 for providing an amplified electrical signal.

Acoustic transducer 214 has an input terminal for receiving the amplified electrical signal, and an output terminal adapted to transmit a generated pulse signal, also described as an acoustic signal. Acoustic transducer 214 may be, for example, a piezoelectric sensor.

Sensing circuit 220 has an input connected to acoustic transducer 214, an input for receiving a chirp signal as a full chirp signal and/or a chirp tail signal, and an output for providing a first and a second chirp correlation signal.

ECU 104 has an input for receiving the first chirp correlation signal, and an input for receiving the second chirp correlation signal.

In operation, ECU 104 provides the control signal to frequency generator 208. Frequency generator 208 generates a signal and provides the generated signal to transmitter amplifier 212 as an electrical signal, at a first time. Transmitter amplifier 212 amplifies the power of the signal generated by frequency generator 208 and provides the electrical signal to acoustic transducer 214. When transmitter amplifier 212 is not implemented, frequency generator 208 provides the un-amplified signal to acoustic transducer 214. Acoustic transducer 214 vibrates and generates an acoustic signal that corresponds to the input signal provided. The acoustic signal generated by acoustic transducer 214 travels away from acoustic transducer 214. Acoustic transducer 214 monitors the couplant (or air) for echo signals, and then transmits a pulse signal that corresponds to the received echo signal to sensing circuit 220. Sensing circuit 220 utilizes the pulse signal received from acoustic transducer 214 and the input of the chirp signal to determine a first correlation signal. Similarly, sensing circuit 220 utilizes the pulse signal received from acoustic transducer 214 and the input of the chirp signal (or a derivative thereof) to determine a second correlation signal. ECU 104 compares the first and second correlated signals to a determined threshold to provide a short range time of flight signal and a long range time of flight signal. ECU 104 provides a distance measurement signal in response to an activation of the short range time of flight signal after an end of reverberation and before a first predetermined time. ECU 104 provides a long range distance measurement signal in response to detecting the long range time of flight signal after the first predetermined time.

Figure 3:
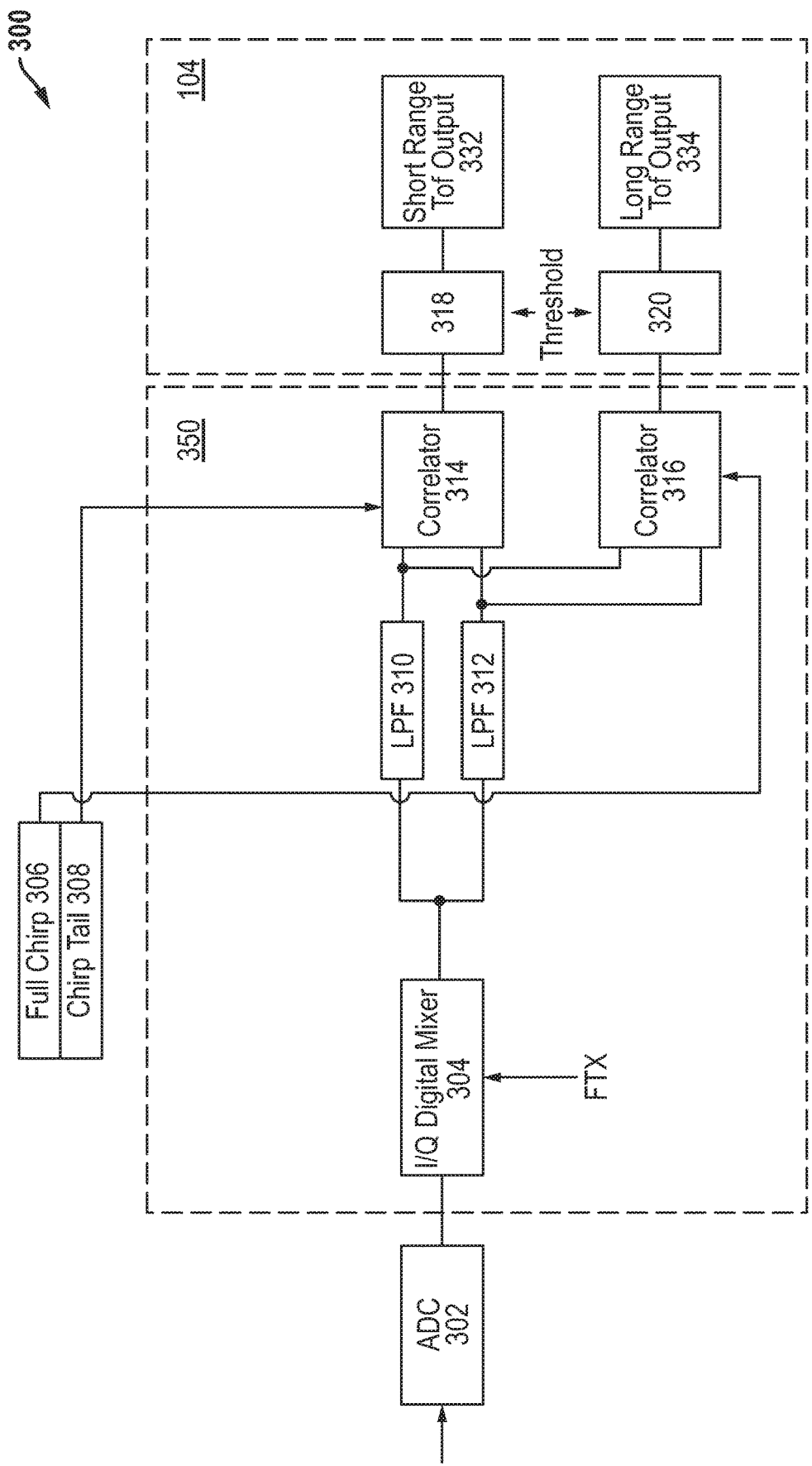
FIG. 3 illustrates in block diagram form the sensing circuit of FIG. 2 implemented with the use of a full chirp pattern and a chirp tail pattern according to an embodiment.

FIG. 3 illustrates in block diagram form sensing circuit 220 of FIG. 2 implemented with the use of a full chirp pattern and a chirp tail pattern. Acoustic distance measuring circuit 300 includes an analog to digital converter 302, a sensing circuit 350 that can be used as sensing circuit 220 of FIG. 2, a full chirp signal pattern 306, a chirp tail signal pattern 308, and ECU 104. Sensing circuit 350 includes, generally, an in-phase quadrature (I/Q) digital mixer 304, low pass filter 310, low pass filter 312, correlator module 314, and correlator module 316. ECU 104 generally includes echo detection module 318 and echo detection module 320, where echo detection modules 318 and 320 have inputs for receiving a predefined threshold.

Within sensing circuit 350 analog-to-digital converter 302 has an input connected to the output of a transducer (for example, acoustic transducer 214 of FIG. 2) for receiving an input signal, and an output. I/Q digital mixer 304 has an input connected to the output of analog to digital converter 302, an input for receiving a carrier signal, and first and second outputs for providing an in-phase signal and a quadrature signal that represent an amplitude and a phase of the signal input from the acoustic transducer in the complex plane. Low pass filter 310 is a digital filter that has an input connected to the output of I/Q digital mixer 304, and an output for providing a filtered in-phase signal. Low pass filter 312 is also a digital filter that has an input connected to the output of I/Q digital mixer 304, and an output for providing a filtered quadrature signal. Correlator module 314 has an input connected to the output of low pass filter 310, an input connected to the output of lowpass filter 312, an input for receiving chirp tail pattern 308, and an output for providing the chirp tail correlation signal. Correlator module 316 has an input connected to the output of lowpass filter 310, an input connected to the output of low pass filter 312, an input for receiving full chirp pattern 306, and an output for providing the full chirp correlation signal.

Within ECU 104 echo detection module 318 has an input connected to correlator module 314, an input for receiving a predetermined threshold, and an output for providing the short range time of flight signal 332. Echo detection module 320 has an input connected to correlator module 314, an input for receiving the predetermined threshold, and an output for providing the long range time of flight signal 334.

In operation, sensing circuit 350 receives a signal that includes the echo of the chirp signal, if an object reflects it back, as the input signal at I/Q digital mixer 304. The input signal is a digitally converted signal received from acoustic transducer 214 of FIG. 2 (or a receiver amplifier if incorporated) resulting from echo signals received by acoustic transducer 214 produced by reflections off physical objects. The chirp signal is frequency modulated, therefore reverberations are at the carrier frequency. I/Q digital mixer 304 also receives a second input signal as a mixing signal at the carrier frequency. Therefore, I/Q digital mixer 304 shifts the difference component of the input signal to baseband (zero frequency) and shifts the sum component to twice the center frequency, 2fc. I/Q digital mixer 304 outputs a quadrature representation of the received signal, or a quadrature signal. Low pass filter 310 receives the in-phase signal and low pass filter 312 receives the quadrature signal, where the quadrature signal is a quadrature representation of the received signal. Low pass filter 310 has an input connected to the output of I/Q digital mixer 304, and an output for providing a filtered in-phase portion of the baseband signal. Low pass filter 312 has an input coupled to the output of digital mixer 304, and an output for providing a filtered quadrature portion of the baseband signal. LPF 310 and LPF 312 filter out the sum component of the output of I/Q digital mixer 304. Correlator module 314 receives the in-phase portion of the baseband signal from low pass filter 310, and also receives chirp tail signal pattern 308. Correlator module 314 samples the in-phase portion of the baseband signal and chirp tail signal pattern 308 for a first predetermined period of time that corresponds to short range detection distance 133 (of FIG. 1). Correlator module 314 outputs the chirp tail correlation signal whose magnitude represents a degree of correlation between the received signal and the chirp tail pattern. Similarly, correlator module 316 receives a filtered quadrature portion of the baseband signal from low pass filter 312, and also receives full chirp signal pattern 306. Correlator module 316 samples the in-phase portion of the baseband signal and full chirp signal pattern 306 for a predetermined period of time after the first predetermined period of time that corresponds to long range detection distance 132 (of FIG. 1). Correlator module 316 outputs the full chirp correlation signal whose magnitude represents a degree of correlation between the received signal and the full chirp pattern.

Further, ECU 104 receives the chirp tail correlation signal at echo detection module 318, and receives full chirp correlation signal at echo detection module 320. Echo detection module 318 and echo detection module 320 also receive a predetermined threshold value. The chirp tail correlation signal and the predetermined threshold are compared at echo detection module 318. Echo detection module 318 determines a short range position estimate in response to detection of a signal match of the chirp tail correlation signal and the chirp tail pattern at a magnitude greater than the predetermined threshold. Responsively, echo detection module 318 outputs the short range time of flight signal 332 to indicate the amount of time between the time transducer 214 outputs the chirp signal and the time echo detection module 318 detects the chirp tail. Echo detection module 320 compares the full chirp correlation signal to the predetermined threshold. Echo detection module 320 determines a long range position estimate in response to detection of a signal match of the full chirp correlation signal and the full chirp signal pattern at a magnitude greater than the predetermined threshold. Responsively, echo detection module 320 outputs long range time of flight signal 334 to indicate the amount of time between the time transducer 214 outputs the chirp signal and the time echo detection module 320 detects the full chirp.

Acoustic distance measuring system 300 correlates the received signal to the full chirp pattern 306 to provide dependable long range object detection. Acoustic distance measuring system 300 correlates the received signal to the chirp tail pattern 308 to improve signal resolution and to provide accurate short range object detection. By incorporating both full chirp signal pattern 306 and chirp tail signal pattern 308 with the use of dual correlator modules 314 and 316, acoustic distance measuring circuit 300 is able to detect objects within a wide distance range, such as from approximately 0.15 meters to greater than 7 meters, using single modulation and/or a single measurement mode detection.

Figure 4:
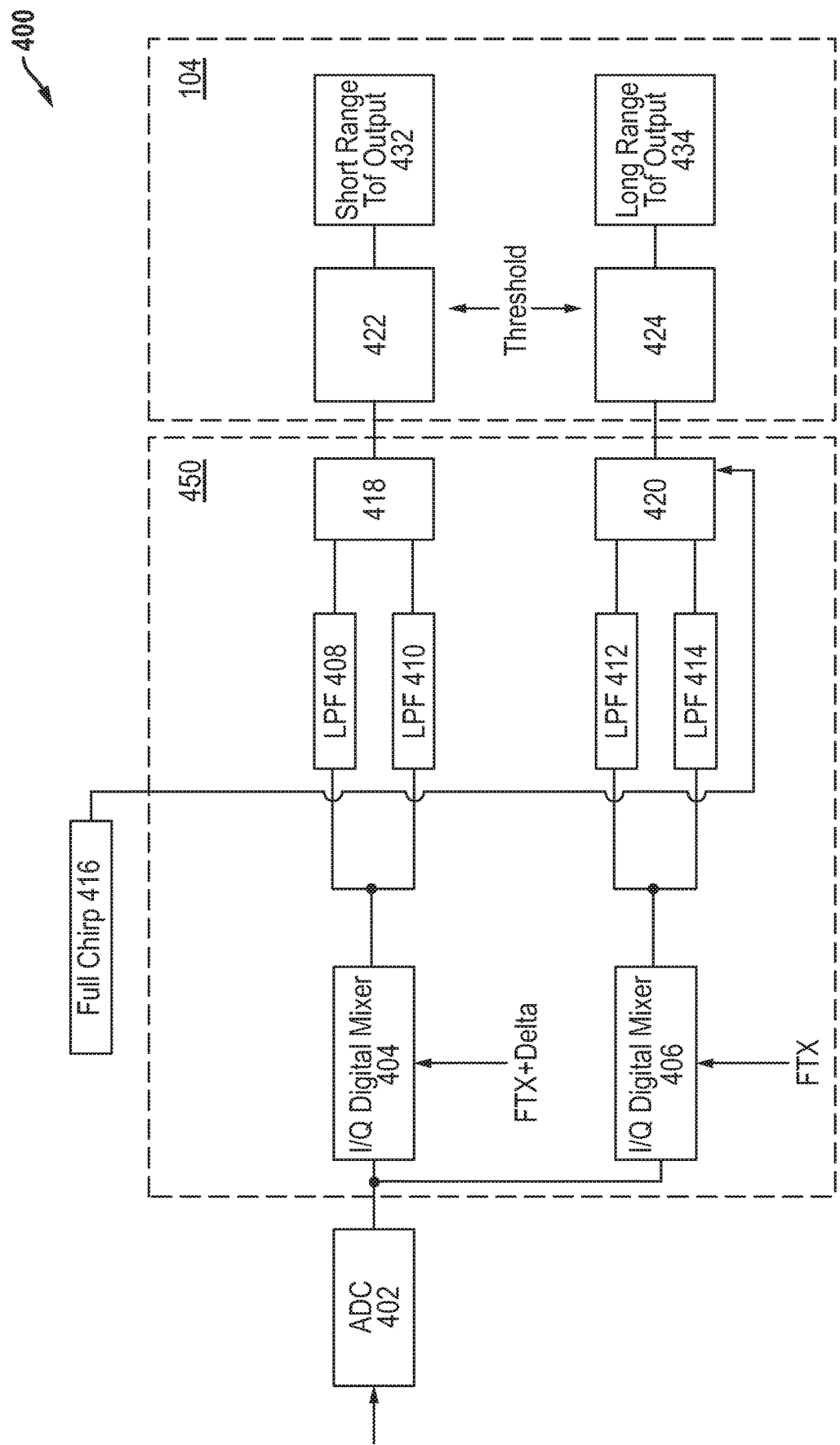
FIG. 4 illustrates in block diagram form the sensing circuit of FIG. 2 implemented with the use of a full chirp pattern according to an embodiment.

FIG. 4 illustrates in block diagram an acoustic distance measuring circuit 400 implemented with the use of a full chirp pattern. Acoustic distance measuring circuit 400 includes an analog to digital converter 402, a sensing circuit 450 that can be used as sensing circuit 220 of FIG. 2, a full chirp signal pattern 416, and ECU 104. Sensing circuit 450 includes, generally, I/Q digital mixers 404 and 406, low pass filters 408, 410, 412, and 414, magnitude detector 418, and correlator module 420. ECU 104 generally includes echo detection module 422, echo detection module 424, an input for receiving a defined threshold, and an output for providing short range time of flight output 432 and long range time of flight 434.

Within sensing circuit 450 analog-to-digital converter 402 has an input connected to the output of a transducer (for example, acoustic transducer 214 of FIG. 2) for receiving an input signal, and an output. I/Q digital mixer 404 has an input connected to the output of analog to digital converter 402, an input for receiving a mixing signal FTX plus a delta offset, and an output for providing in phase and quadrature representations of the mixed signal. I/Q digital mixer 406 has an input for receiving a baseband signal and that has an input connected to the output of analog to digital converter 402, and an output for providing an in-phase (I) and quadrature (Q) representations of the mixed signal. Low pass filter 408 is a digital filter that has an input connected to the I output of I/Q digital mixer 404, and an output for providing a filtered in-phase portion of the mixed signal, i.e. the baseband signal. Low pass filter 410 is also a digital filter that has an input connected to the Q output of I/Q digital mixer 404, and an output for providing a filtered quadrature portion of the baseband signal. Low pass filter 412 is a digital filter that has an input connected to the I output of I/Q digital mixer 406, and an output for providing a filtered in-phase portion of the baseband signal. Low pass filter 414 is also a digital filter that has an input connected to the Q output of I/Q digital mixer 406, and an output for providing a filtered quadrature portion of the baseband signal. Magnitude detector 418 has inputs connected to the outputs of low pass filter 408 and low pass filter 410, and an output for providing a magnitude of the filtered baseband signal. Correlator module 420 has an input connected to the output of low pass filter 412, an input connected to the output of low pass filter 414, an input for receiving full chirp signal pattern 416, and an output for providing the full chirp correlation signal.

Within ECU 104 echo detection module 422 has an input connected to the output of magnitude detector 418 and an input for receiving a predetermined threshold, and an output for providing the short range time of flight output 432. Echo detection module 424 has an input connected to correlator module 420 and an input for receiving the predetermined threshold, and an output for providing the long range time of flight output 434.

In operation, sensing circuit 450 receives a signal that includes the echo of the chirp signal if an object reflects it back as an input signal at I/Q digital mixer 404. In this case the input signal contains a digitally converted pulse received from acoustic transducer 214 (of FIG. 2) resulting from echo signals received by acoustic transducer 214 produced by reflections off physical objects. I/Q digital mixer 404 also receives an input carrier signal plus a delta offset, and provides a frequency shifted signal representation of the received signal. The frequency shifted signal representation of the received signal is frequency shifted towards the chirp tail of the input signal. The tail of the chirp signal differs from transducer resonant frequency, and therefore it is possible to differentiate between the chirp and an end of reverberation (transducer decay signal). Low pass filter 408 and low pass filter 410 each receive the frequency shifted signal representation of the received signal. Low pass filter 408 and low pass filter 410 filter the undesired portions of the spectrum from the frequency shifted signal representation of the received signal. Low pass filter 408 outputs a filtered in-phase portion of the received signal. Low pass filter 410 outputs a filtered quadrature portion of the received signal. I/Q digital mixer 406 multiplies the received signal and outputs in-phase and quadrature representations of the received signal to low pass filter 412 and low pass filter 414, respectively. Low pass filter 412 outputs the filtered in-phase portion of the mixed signal. Low pass filter 414 outputs the filtered quadrature portion of the mixed signal. In another embodiment, low pass filter 408, 410, 412, and 414 can be replaced with bandpass filters that filter a determined frequency of noise from the in-phase portion of the carrier signal and the quadrature portion of the carrier signal. In another embodiment, sensing circuit 450 could process the received signal at an intermediate frequency, in which case lowpass filters 408, 410, 412, and 414 would use bandpass filters.

Further, magnitude detector 418 receives the filtered in-phase signal from low pass filter 408, and also receives the filtered quadrature signal from low pass filter 410. Magnitude detector 418 calculates the magnitude of received echo using the filtered in-phase and quadrature portions of the received signal. Correlator module 420 determines the degree of correlation between the received signal and the full chirp pattern using the filtered in-phase and quadrature portions of the received signal, and responsively outputs a full chirp correlation signal whose magnitude represents a degree of correlation between the received signal and the full chirp pattern.

Moreover, ECU 104 receives the magnitude signal at echo detection module 422. Echo detection module 422 also receives the predetermined threshold. In response detecting the magnitude signal is greater than the predetermined threshold, echo detection module 422 provides short range time of flight output 432. Additionally, ECU 104 receives the degree of correlation signal at echo detection module 424, and receives the predetermined threshold. In response to detection of a signal match of the full chirp correlation signal and the carrier signal at a magnitude greater than the predetermined threshold, echo detection module 424 provides long range time of flight output 434.

In one embodiment, echo detection module 422 and echo detection module 424 can exist, structurally, in ECU 104 as illustrated, and/or in sensing circuit 450. For example, echo detection module 422 and echo detection module 424 can both be positioned in sensing circuit 450. Further, echo detection module 422 is positioned in sensing circuit 450 while echo detection module 424 is positioned in ECU 104, and vice versa. Additionally, echo detection module 422 and echo detection module 424 receives a predetermined threshold that is similar for both short range and long range object detection. In still another embodiment, echo detection module 422 receives a predetermined threshold that is specific to short range object detection, and echo detection module 424 receives a predetermined threshold that is specific to long range object detection.

Acoustic distance measuring system 400 correlates the received signal to the full chirp pattern 416 to provide dependable long range object detection. Acoustic distance measuring system 400 implements magnitude detector 418 to improve signal resolution and to provide accurate short range object detection. By incorporating both full chirp signal pattern 416 and shape modulation to the chirp input signal during transmission phase to achieve frequency characteristics of the chirp tail, acoustic distance measuring circuit 400 is able to detect objects within a wide distance range of approximately 0.15 meters to greater than 7 meters using single modulation and/or a single measurement mode detection.

Figure 5:
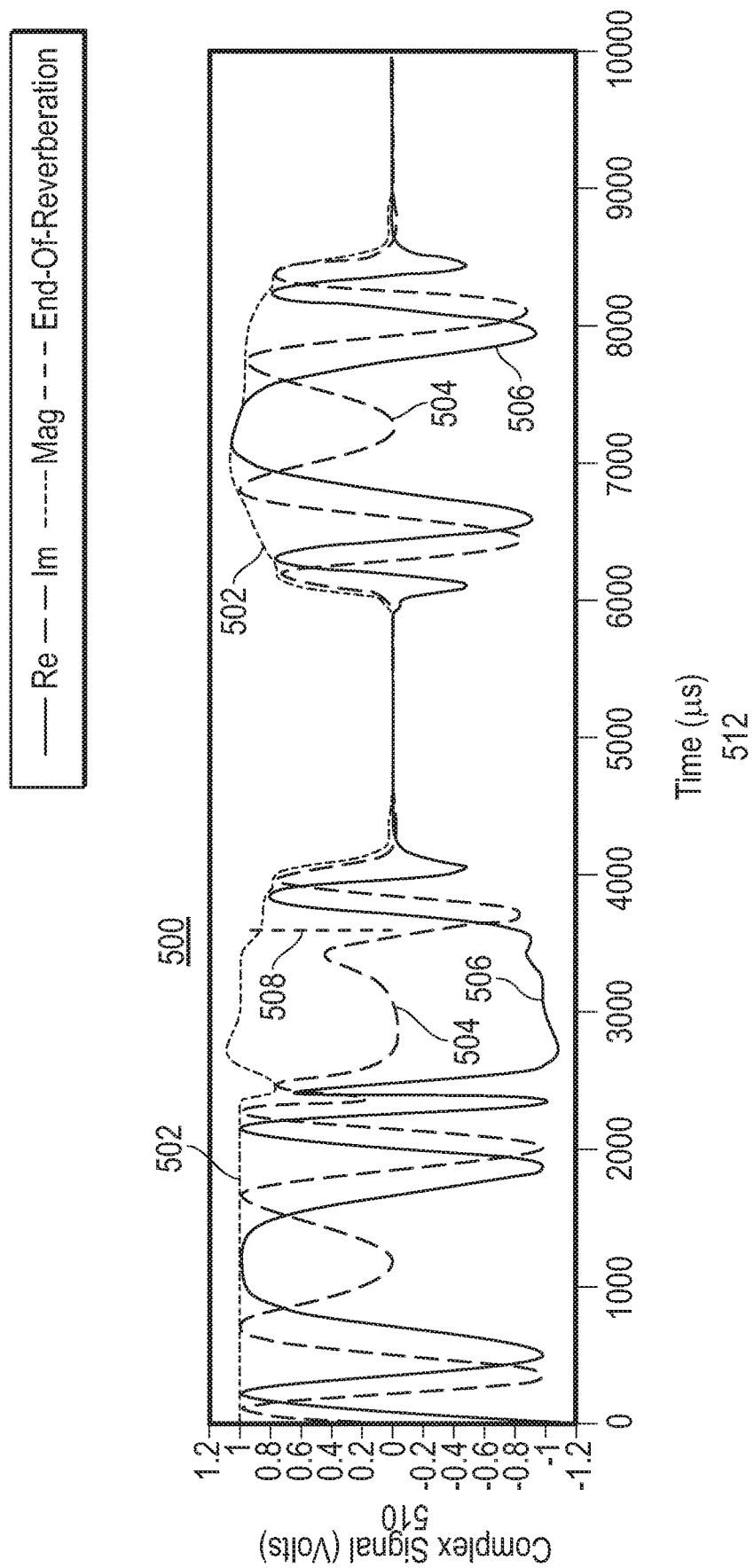
FIG. 5 illustrates a timing diagram for depicting the transmission and reception of signals generated by the acoustic transducer of the sensing circuit of FIG. 2 according to an embodiment.

FIG. 5 illustrates a timing diagram for depicting the transmission and reception of signals generated by the acoustic transducer of the sensing circuit of FIG. 2. Timing diagram 500 includes a complex signal 510 situated on the y-axis and time (microseconds) 512 situated on the x-axis. Additionally, timing diagram 500 includes a magnitude signal 502, a quadrature signal 504, an in-phase signal 506, and an end-of-reverberation point 508. Magnitude signal 502 is the magnitude of the baseband signal. Quadrature signal 504 is a filtered quadrature signal, and in-phase signal 506 is a filtered in-phase signal. End-of-reverberation point 508 represents a predetermined end of the reverberations for acoustic transducer 214.

An ultrasonic pulse signal is transmitted with the aid of acoustic transducer 214. The received signal, which includes the ultrasonic pulse that is reflected from a detected object, is transmitted by acoustic transducer 214 and received at I/Q digital mixer 304. At I/Q digital mixer 304, the input signal is multiplied with a baseband signal. I/Q digital mixer 304 outputs an in-phase quadrature representation of the baseband signal, represented as quadrature signal 504 and in-phase signal 506 as illustrated by timing diagram 500. Within timing diagram 500, a time previous to end-of-reverberation point 508 is illustrative of the time of transmission of the pulse signal from acoustic transducer 214. Magnitude signal 502 depicts the magnitude of the chirp transmission. Reverberations, expected at the frequency of the carrier signal, are interrupted when echoes from a detected object interfere with the reverberations. This interference is detected in timing diagram 500 at 2250 microseconds. After end-of-reverberation point 508, a chirp tail is detected. The chirp tail signal, which differs from the pattern of reverberations, being present after end-of-reverberation point 508 signifies an obstacle has been detected within a short range distance relative to acoustic transducer 214. Further, signals received after 6000 microseconds are representative of objects detected at a long range.

Figure 6:
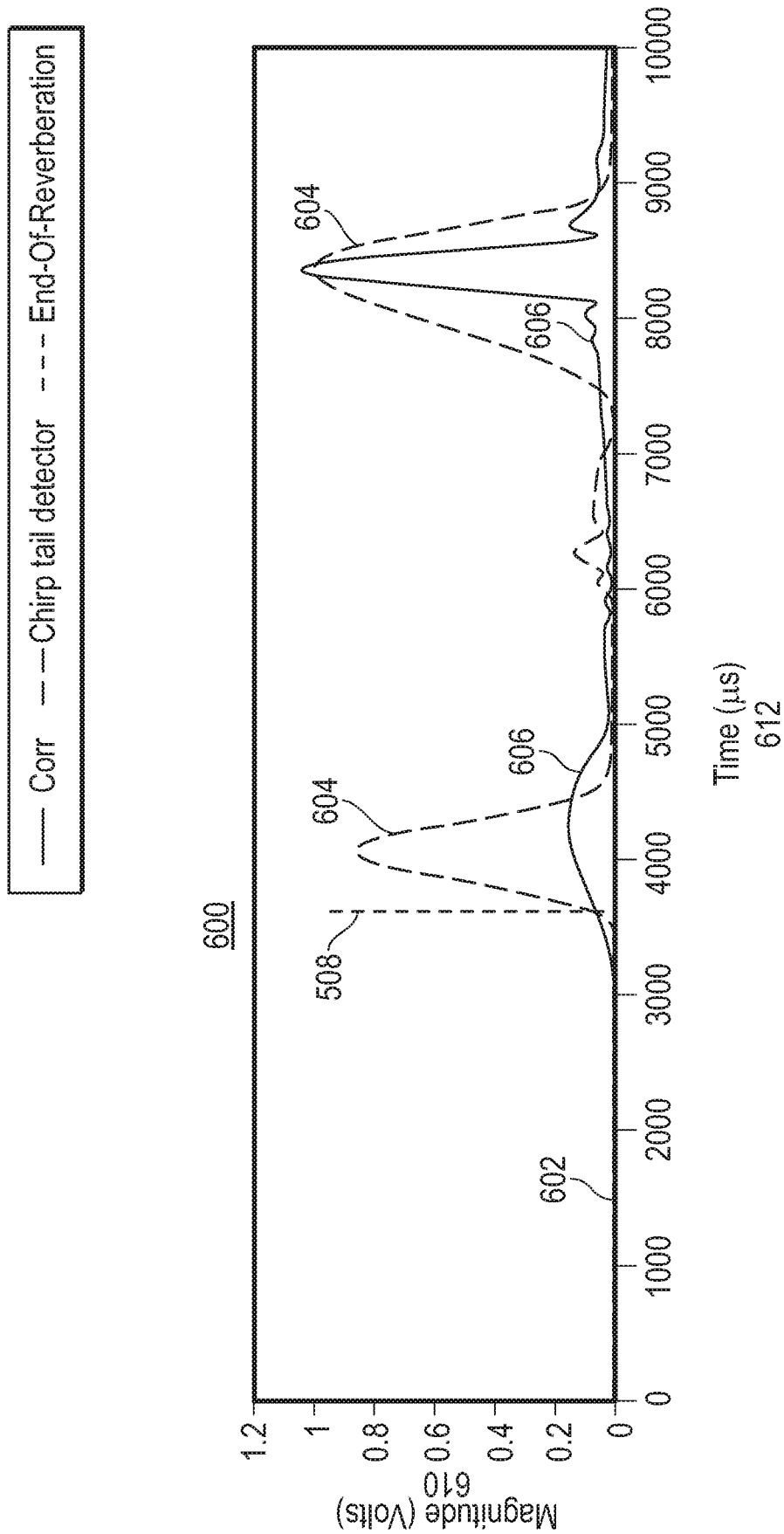
FIG. 6 illustrates a timing diagram for reporting the output of the first and second correlators associated with the sensing circuit of FIG. 3 according to an embodiment.

FIG. 6 illustrates a timing diagram for reporting the output of the first and second correlators associated with the sensing circuit of FIG. 3. Timing diagram 600 includes a magnitude scale (volts) 610 situated on the y-axis and time (microseconds) 612 situated on the x-axis. Additionally, timing diagram 600 includes end-of-reverberations point 508, a threshold 602, a chirp tail correlated signal 604, and a full chirp correlated signal 606.

Timing diagram 600 depicts the output of a first and second correlator for short range and long range object detection. For example, quadrature signal 504 and in-phase signal 506 detected at a predetermined time after end-of-reverberations point 508 are input into a first correlator, or correlator module 314. The short range position estimate is determined in response to detection of a signal match of the chirp tail correlation signal and the chirp tail pattern at a magnitude greater than the predetermined threshold. Chirp tail correlated signal 604 depicts short range time of flight output 332. A second correlator, correlator 316, is applied to correlate quadrature signal 504 and in-phase signal 506 for detection of an object within a second predetermined time range for a long range position estimate. The long range position estimate is determined in response to detection of a signal match of the full chirp correlation signal and the full chirp signal pattern at a magnitude greater than the predetermined threshold. Full chirp correlated signal 606 depicts long range time of flight output 334.

Figure 7:
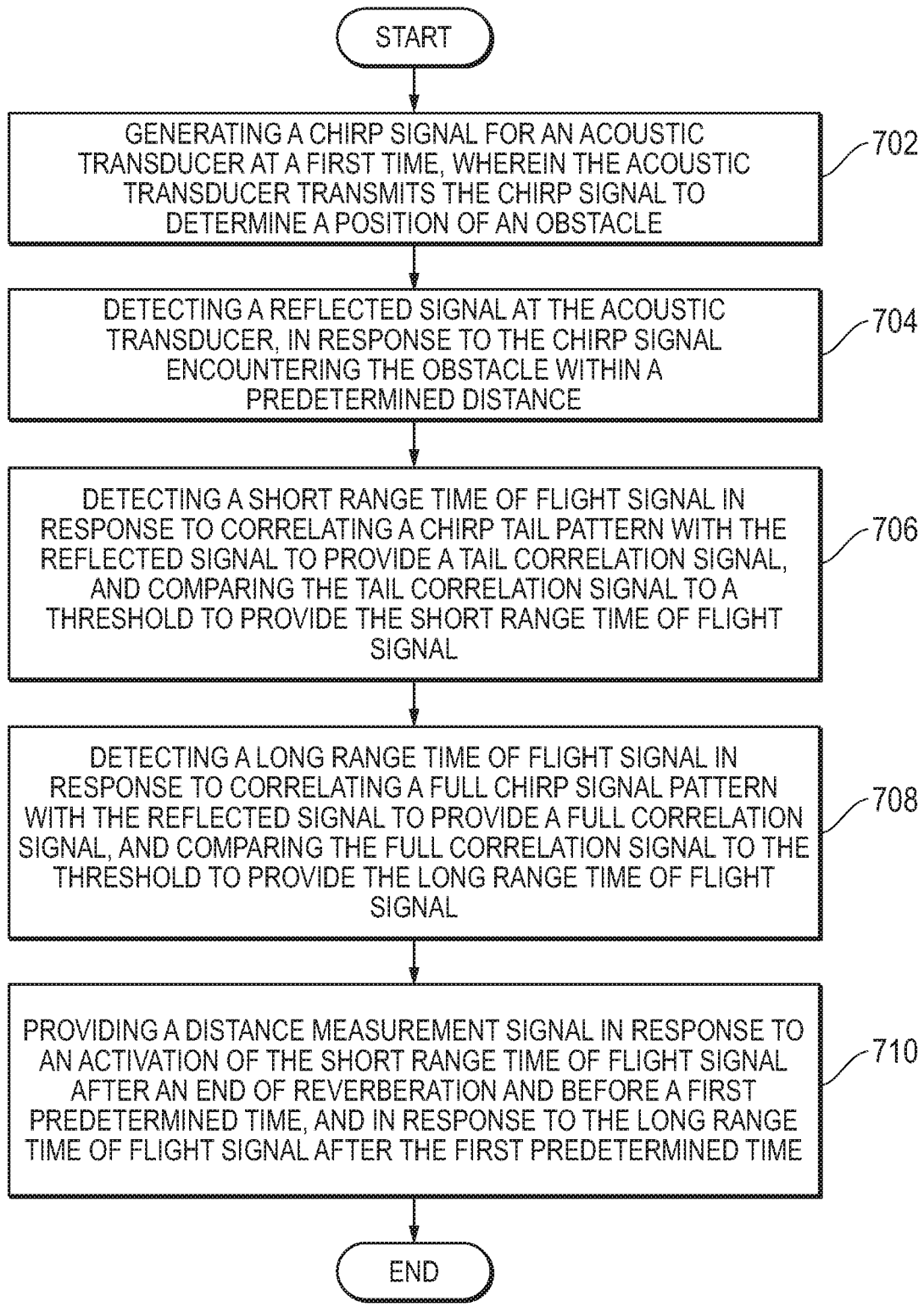
FIG. 7 illustrates a flow diagram of a method for reporting the short range time of flight signal and the long range time of flight signal in response to a detected obstacle according to an embodiment.

FIG. 7 illustrates a flow diagram of a method for reporting the short range time of flight signal and the long range time of flight signal in response to a detected obstacle. At block 702 a chirp signal for an acoustic transducer at a first time is generated. The acoustic transducer transmits the chirp signal to determine a position of an obstacle. A pulse is detected at the acoustic transducer, in response to the acoustic signal encountering an obstacle within a predetermined distance, at block 704. At block 706, a short range time of flight signal is detected in response to correlating a chirp tail signal pattern with the reflected signal to provide a chirp tail correlation signal. The chirp tail correlation signal is compared to a threshold to provide the short range time of flight signal. At block 708, a signal is detected in response to correlating a full chirp signal pattern with the reflected signal to provide a full chirp correlation signal. The full chirp correlation signal is compared to a threshold to provide a long range time of flight signal. A distance measurement signal is provided at ECU 104 in response to an activation of the long range time of flight after an end of reverberations and before a first predetermined time, at block 710. Additionally, at block 710 a distance measurement signal is provided in response to the long range time of flight signal after the first predetermined time.

The above-disclosed subject matter is to be considered illustrative, and not restrictive, and the appended claims are intended to cover all such modifications, enhancements, and other embodiments that fall within the true scope of the claims. In an alternate embodiment, a basic acoustic distance measuring system includes a sensing circuit and a controller.

The acoustic measuring system transmits a chirp pulse with the aid of a resonant transducer element. A receiver signal, also called the echo pulse, includes the chirp pulse which is reflected when an obstacle is present, is received at the sensing circuit. The frequency of the echo pulse is modulated with the carrier signal, resulting in an in-phase signal and a quadrature signal. The in-phase signal is an in-phase representation of the received signal, and the quadrature signal is a quadrature representation of the received signal. Dual correlators receive the in-phase signal and quadrature signal. A first correlator samples the in-phase signal with a chirp tail signal, and a second correlator samples the quadrature signal with a full chirp signal at predetermined times after the detected reverberations. A first echo detection module receives the input from the first correlator module, receives an input of a predetermined threshold, and outputs a short distance time of flight. The short distance time of flight is the point at which the magnitude of the echo, received at the first echo magnitude detector, crosses the predetermined threshold. The second echo detection module receives input from the second correlator module, receives input of the predetermined threshold, and outputs a long distance time of flight. The long distance time of flight is the point at which the magnitude of the echo, received at the second echo magnitude detector, crosses the predetermined threshold.

In one embodiment, to timely output a corrected time of flight for the short distance and long distance time of flight at ECU 104, in response to when the acoustic signal encounters the obstacle, at least one of a Q factor delay and a transducer Q factor delay are factored into a time of flight correction calculation. A corrected time of flight is received at ECU 104 when a compensation time is subtracted from the first time of when the rising edge of the magnitude of the pulse received from the transducer intersects the predetermined threshold.

Further, the Q factor time delay of low pass filters 310 and 312 and transducer 214 determine a maximum time to receive transmission of a pulse measurement before a corrected time of flight measurement is provided to ECU 104. The digital filter quality factor time delay determines the time delay needed for sensing circuit 350 to provide the corrected time of flight to ECU 104 with accurate timing. The value of the digital filter Q factor time delay is dynamically selected when the first magnitude of the received pulse is detected. As an increase in the digital filter Q factor time delay is detected, a response time of the digital filter automatically increases. In response to detection of a value for the digital filter Q factor time delay that is below a predetermined Q factor time delay value, the transducer Q factor time delay is dynamically input when the magnitude of the received pulse is detected. Integrating the dynamically determined fixed delay into the time of flight correction algorithm enables sensing circuit 350 to properly compensate for the time needed to transmit the corrected time of flight to ECU 104, thereby enabling increased accuracy of obstacle detection while maintaining an accurate, real-time reporting, of the time of flight.

In another embodiment, digital filter Q factor is fixed when transducer 214 receives the echo pulse signal. A digital filter Q factor is selected to improve performance of sensing circuit 350. For example, the digital filter Q factor is a predetermined Q factor in the range of Q5 to Q20. A high value for a digital filter, such as low pass filter 310 and 312, enables the low pass filters to achieve a high signal to noise ratio, or increased noise suppression. However, Doppler performance of the low pass filters is less than optimal when a high Q factor value is selected. When a low value for the digital filter Q factor is selected, Doppler performance of acoustic measuring system 300 (as well as acoustic measuring system 400) is better; however, the signal to noise ratio is low, enabling less noise to be suppressed. The pulse rise time is dependent on the selected Q factor of low pass filters 310 and 312; therefore, the digital filter Q factor time delay is a factor in reporting the corrected time of flight of the acoustic signal to ECU 104. For example, for a quality factor value of Q5 for low pass filter 310 and 312, the time for pulse signal to rise from 50% to 100% is half the time it takes for the pulse signal to rise from 50% to 100% in the case of a Q10 quality factor value. For low Q digital filter settings the transducer Q factor time delay is utilized to determine the time of flight. In one embodiment, the value for the digital filter Q factor is a predetermined Q factor value. The digital filter Q factor is selected prior to the onset of a measurement, and remains the same Q factor for the duration of the measurement. In another embodiment, at least one of a low Q factor and a high Q factor is selected to correspond to a predefined measurement distance. In one example, the reflections received from an obstacle at a close distance (for example less than 0.3 meters), benefits from an improved signal to noise ratio; therefore, a higher (or increased) Q factor is applied.

While the subject matter is described with specific preferred embodiments and example embodiments, the foregoing drawings and descriptions thereof depict only typical embodiments of the subject matter and are not therefore to be considered as limiting of its scope, and many alternatives and variations will be apparent to those skilled in the art. Inventive aspects of the present disclosure may lie in less than all features of a single foregoing disclosed embodiment.

What is claimed is:

1. An acoustic distance measuring circuit, comprising:
   a frequency generator having an output for providing a chirp signal;
   a transmitter amplifier having an input coupled to the output of the frequency generator, and output adapted to be coupled to an acoustic transducer;
   a sensing circuit having an input adapted to be coupled to the acoustic transducer, a first correlation output for providing a chirp tail correlation signal, and a second output for providing a full chirp correlation signal, wherein the sensing circuit provides the chirp tail correlation signal in response to correlating a chirp tail signal pattern with a received signal, and provides a full chirp correlation signal in response to correlating a full chirp signal pattern with the received signal; and
   a controller adapted to be coupled to the sensing circuit having a first input for receiving the chirp tail correlation signal and the full chirp correlation signal for determining a short range time of flight signal and a long range time of flight signal.

2. The acoustic distance measuring circuit of claim 1, wherein the controller provides the short range time of flight signal in response to receiving the chirp tail correlation signal, and comparing the chirp tail correlation signal to a threshold to provide the short range time of flight signal.

3. The acoustic distance measuring circuit of claim 1, wherein the controller provides the long range time of flight signal in response to receiving the full chirp correlation signal, and comparing the full chirp correlation signal to a threshold to provide the long range time of flight signal.

4. The acoustic distance measuring circuit of claim 1, the controller provides a distance measurement signal in response to an activation of the short range time of flight signal after an end of reverberation and before a first predetermined time, and in response to the long range time of flight signal after the first predetermined time.

5. The acoustic distance measuring circuit of claim 1, wherein the sensing circuit comprises:
   an in-phase and quadrature (I/Q) digital mixer having an input coupled to the output of the acoustic transducer, an input for receiving a baseband signal, and an output for providing a quadrature signal, wherein the quadrature signal is a quadrature representation of the received signal;
   a first digital filter having an input coupled to the output of the I/Q digital mixer, and an output for providing a filtered in-phase portion of the baseband signal; and
   a second digital filter having an input coupled to the output of the I/Q digital mixer, and an output for providing a filtered quadrature portion of the baseband signal.

6. The acoustic distance measuring circuit of claim 5, wherein the first digital filter and the second digital filter is a low pass digital filter.

7. The acoustic distance measuring circuit of claim 5, wherein the sensing circuit further comprises:
   a first correlator module having an input coupled to the first digital filter, an input coupled to the second digital filter, an input for receiving the chirp tail signal pattern, and an output for providing the chirp tail correlation signal; and
   a second correlator module having an input coupled to the first digital filter, an input coupled to the second digital filter, an input for receiving the full chirp signal pattern, and an output for providing the full chirp correlation signal.

8. The acoustic distance measuring circuit of claim 7, wherein the controller comprises:
   a first echo detection module having an input coupled to the first correlator module and input for receiving a predetermined threshold, and an output for providing the short range time of flight signal, wherein a short range position estimate is determined in response to detection of a signal match of the chirp tail correlation signal and the chirp tail signal pattern at a magnitude greater than the predetermined threshold; and
   a second echo detection module having an input coupled to the second correlator module and input for receiving the predetermined threshold, and an output for providing the long range time of flight signal, wherein a long range position estimate is determined in response to detection of a signal match of the full chirp correlation signal and the full chirp signal pattern at a magnitude greater than the predetermined threshold.

9. The acoustic distance measuring circuit of claim 1, wherein the sensing circuit comprises:
   a first digital I/Q mixer having an input coupled to the output of the acoustic transducer, an input for receiving a carrier signal plus a delta offset, and an output for providing a frequency shifted signal representation of the carrier signal, wherein the frequency shifted signal representation of the carrier signal is frequency shifted towards a tail of the full chirp signal pattern; and
   a second digital I/Q mixer having an input coupled to the output of the acoustic transducer, an input for receiving a carrier signal, and an output for providing an in-phase quadrature representation of the carrier signal.

10. The acoustic distance measuring circuit of claim 9, wherein the sensing circuit comprises:

a first digital filter having an input coupled to the first digital I/Q mixer, and an output, coupled to a magnitude detector, for providing a filtered in-phase portion of the carrier signal; and a second digital filter having an input coupled to the first I/Q digital mixer, and an output, coupled to the magnitude detector, for providing a filtered quadrature portion of the carrier signal.

11. The acoustic distance measuring circuit of claim 10, wherein the sensing circuit comprises:
a third digital filter having an input coupled to the second digital I/Q mixer, and an output, coupled to a correlator, for providing a filtered in-phase portion of the carrier signal; and
a fourth digital filter having an input coupled to the second digital I/Q mixer, and an output, coupled to the correlator, for providing a filtered quadrature portion of the carrier signal.

12. The acoustic distance measuring circuit of claim 10, wherein the sensing circuit comprises:
a magnitude detector having an input coupled to the first digital filter, an input coupled to the second digital filter, and an output for providing a magnitude of the filtered in-phase portion of the carrier signal.

13. The acoustic distance measuring circuit of claim 11, wherein the sensing circuit comprises:
a correlator module having an input coupled to the third digital filter, an input coupled to the fourth digital filter, an input for receiving the full chirp signal pattern, and an output for providing a full chirp correlation signal.

14. The acoustic distance measuring circuit of claim 12 wherein the sensing circuit comprises:
a first echo detection module having an input coupled to the magnitude detector, an input for receiving a predetermined threshold, and an output for providing the short range time of flight signal, wherein a short range position estimate is determined in response to detection of a magnitude greater than the predetermined threshold.

15. The acoustic distance measuring circuit of claim 13 wherein the sensing circuit comprises:
a second echo detection module having an input coupled to the correlator module, an input for receiving a predetermined threshold, and an output for providing the long range time of flight signal, wherein a long range position estimate is determined in response to detection of a signal match of the full chirp correlation signal and the carrier signal at a magnitude greater than the predetermined threshold.

16. A method comprising:
generating an acoustic signal at an acoustic transducer at a first time, wherein the acoustic transducer transmits the acoustic signal to determine a position of an obstacle;
detecting a reflected signal at the acoustic transducer, in response to the acoustic signal encountering the obstacle within a predetermined distance;
detecting a short range time of flight signal in response to correlating a chirp tail signal pattern with the reflected signal to provide a chirp tail correlation signal, and comparing the chirp tail correlation signal to a threshold to provide the short range time of flight signal; and
detecting a long range time of flight signal in response to correlating a full chirp signal pattern with the reflected signal to provide a full correlation signal, and comparing the full correlation signal to the threshold to provide the long range time of flight signal.

17. The method of claim 16, further comprising:
providing a distance measurement signal in response to an activation of the short range time of flight signal after an end of reverberation and before a first predetermined time, and in response to the long range time of flight signal after the first predetermined time.

18. The method of claim 16, further comprising:
in response to receiving the reflected signal, digitally mixing the reflected signal and a carrier signal to generate a baseband representation of the reflected signal;
shifting the baseband representation of the reflected signal to a zero frequency; and
providing the baseband representation of the reflected signal, at the zero frequency, to a digital filter to remove accumulated noise from the baseband representation of the reflected signal.

19. The method of claim 18, further comprising:
applying a correlator to the baseband representation of the reflected signal and the full chirp signal pattern to detect a peak of a full correlation signal; and
applying a correlator to the baseband representation of the reflected signal and the chirp tail signal pattern to detect a peak of a chirp tail correlation signal.

20. The method of claim 16, further comprising:
receiving a programmable value corresponding to the threshold, wherein the threshold is a determined threshold;
in response to detection of the obstacle within a short range distance, determining the short range time of flight signal in response to a magnitude of the short range time of flight signal being greater than a magnitude of the threshold; and
in response to detection of the obstacle within a long range distance, determining the long range time of flight signal in response to a magnitude of the long range time of flight signal being greater than a magnitude of the threshold.

* * * * *